Feb. 4, 1969
M. A. DEANE
3,425,750
BLEED APPARATUS FOR BLEEDING THE BRAKES OF
A HYBRID HYDRAULIC BRAKE SYSTEM
Filed Feb. 21, 1968
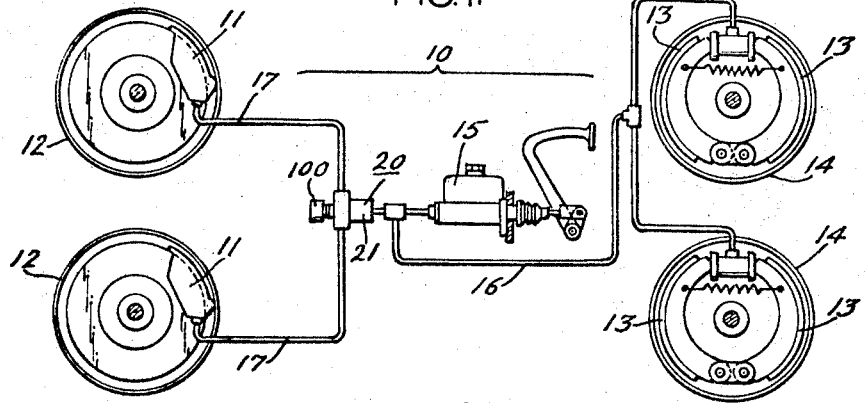
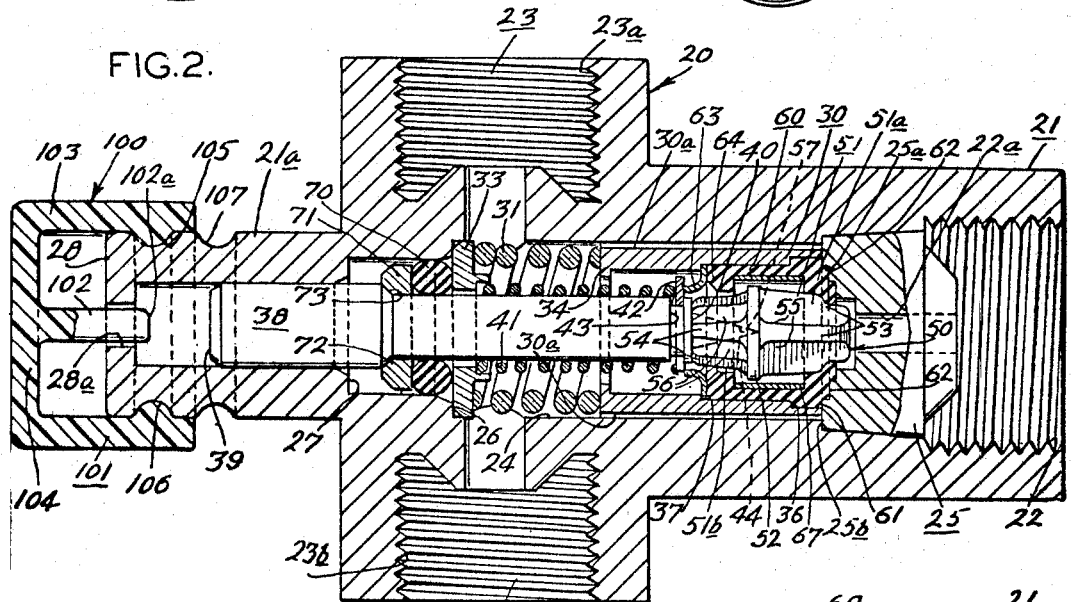
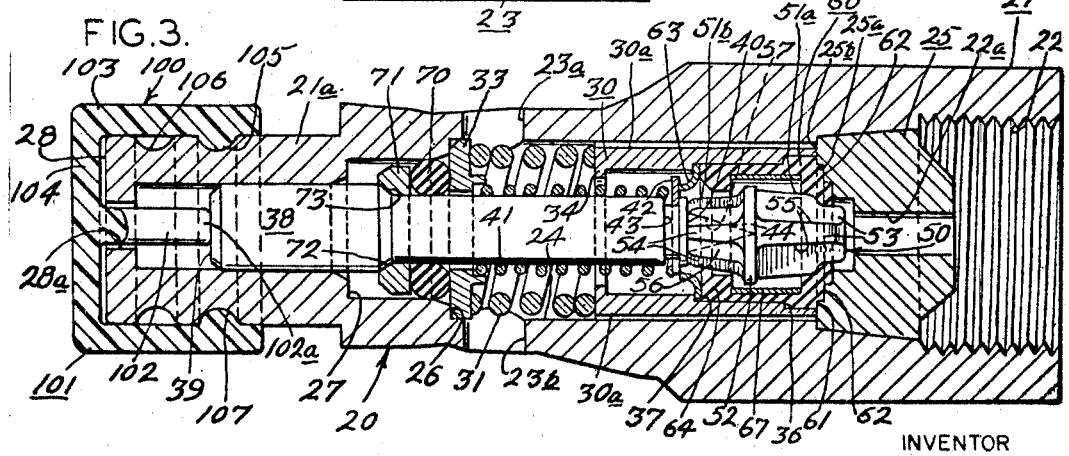
INVENTOR
MARTIN A. DEANE
BY *William J. Dick*
ATTORNEY United States Patent Office 3,425,750
Patented Feb. 4, 1969

3,425,750
BLEED APPARATUS FOR BLEEDING THE BRAKES OF A HYBRID HYDRAULIC BRAKE SYSTEM
Martin A. Deane, Annapolis, Md., assignor to Hydrasearch Co., Inc., Annapolis, Md., a corporation of Maryland
Filed Feb. 21, 1968, Ser. No. 707,046
U.S. Cl. 303—6        4 Claims
Int. Cl. B60t 17/00; F16k 31/14; F15b 7/00

ABSTRACT OF THE DISCLOSURE

Apparatus for bleeding the front disc brake lines of a motor vehicle having a hybrid brake system, and a metering valve intermediate the master cylinder and the disc brakes. As is disclosed herein, the metering valve permits free hydraulic flow of hydraulic fluid to the front disc brakes up to a certain predetermined pressure level thus compensating for pressure and volume changes caused by temperature changes. Thereafter, upon brake application, the valve is closed off until a second pressure level is attained at which time the disc brakes are actuated. In order to bleed the front brakes of entrapped air within the brake lines, it is necessary to hold the metering valve open. Thus the valve includes a body having a bore connected between the inlet and outlet thereof, and a spool and coaxially mounted plunger, both being urged toward the inlet of the valve by separate springs. The plunger is exposed to atmospheric pressure at one end thereof, and at the other end is exposed to hydraulic pressure. Interiorly of the spool is a poppet and a poppet retainer composed of a resilient material which urges the poppet towards the plunger, while the plunger spring tends to urge the plunger and thus the poppet towards the inlet allowing free flow of hydraulic fluid, or fluid communication between the master cylinder and the outlet of the valve. At a predetermined preset pressure level, the plunger moves away from its contact with the poppet permitting the poppet to close off free hydraulic communication and at a second pressure level at the inlet, the entire spool moves away from the inlet against its spring pressuer permitting hydraulic communication once again between the inlet and outlet. To bleed the disc brakes, a cap is positioned over one end of the valve, and includes a central pin which is engageable with the plunger so that upon movement of the cap onto the body the pin registers with the plunger preventing movement of the plunger upon application of pressure from the master cylinder.

Summary of the invention

The present invention relates to a metering valve for use in a hydraulic brake system and more particularly relates to bleeding apparatus for use with an improved metering valve adapted to delay pressurization of the front wheel brakes where the front wheels are provided with disc type brakes and the rear wheels are provided with drum type brakes. The improved metering valve is more fully described in the application of Doerfler, Ser. No. 707,096, filed Feb. 21, 1968, owned by the assignee of this application.

In conventional automotive braking systems having disc brakes on all four wheels; upon hydraulic pressure being communicated to the disc brakes, braking force is developed almost immediately. Because of the linkage and heavy return springs inherent with shoe or drum type brakes a considerable hydraulic pressure must be applied prior to the shoe engaging the drum. Thus in hybrid brake systems having front disc and rear shoe or drum type, if the fluid pressure from the master cylinder is not delayed or metered to the front disc brakes the front brakes will be actuated prior to the rear shoe type brakes, which premature actuation is not only dangerous but can result in increased wear in the front brake system.

However, as the metering valve does not permit fluid communication with the disc brakes (although there is initial free communication) until a high overpressure is effected, it is difficult to purge the brake lines of air because every time the brake pedal is actuated, and until the predetermined hydraulic overpressure point is reached, the valve closes off fluid communication between the inlet and the outlet.

In view of the above it is a principal object of the present invention to provide novel bleeding apparatus operative in conjunction with a metering valve which permits fluid communication between the master cylinder and disc brakes when the brake pedal is applied overriding the tendency of the valve to close off fluid communication.

Another object of the present invention is to provide novel bleeding apparatus for use in conjunction with a metering valve, which apparatus may be automatically disengaged from overriding the valve whereby normal operation of the valve is restored.

Yet another object of the present invention is to provide novel bleeding apparatus for a metering valve which is relatively rugged and of simple construction, and which will serve the double function of a "dust cover" to impede contamination of the valve.

Other objects and a fuller understanding of the invention may be had by referring to the following specification and claims taken in conjunction with the accompanying drawings in which:

FIG. 1 is a diagrammatic view of a hybrid hydraulic brake system embodying the novel bleeding apparatus of the present invention;

FIG. 2 is an enlarged sectional view through the metering valve and bleeding apparatus of the present invention and showing the bleeding apparatus in a disengaged position; and FIG. 3 is a fragmentary sectional view showing the bleeding apparatus in an engaged position for bleeding of the front brake lines.

Referring now to the drawings, and especially FIG. 1, a hybrid brake system 10 is schematically illustrated therein comprising, in the present instance, caliper type disc brakes 11 mounted on front wheels 12 and shoe type brakes 13 mounted on rear wheels 14. As is conventional, a foot actuated hydraulic pressure source or master cylinder 15 is connected via hydraulic piping 16 to the hydraulic pistons associated with the shoe type brakes 13. Although not shown in the drawings, intermediate the master cylinder and the shoe type brakes 13 may be positioned a residual pressure valve and/or a proportioning valve such as shown in the Doerfler Patent No. 3,304,130. Connected to the outlet of the hydraulic master cylinder 15 is a novel metering valve 20 fully described in the copending application of Doerfler, Ser. No. 707,096, filed Feb. 21, 1968, owned by the assignee of this application, and including novel bleed apparatus 100 constructed in accordance with the present invention. As shown, the valve 20 is connected to the caliper type disc brakes 11 mounted on the front wheels 12 by hydraulic piping 17.

Prior to an explanation of how the bleed apparatus 100 operates in conjunction with the metering valve 20, the operation of the metering valve will be described, a more complete explanation being set forth in the copending application of Doerfler, above-mentioned. The metering valve 20, operative in conjunction with the bleed apparatus of the present invention, permits free passage of hydraulic fluid between the master cylinder 15 and the caliper type disc brakes 11 until a first level of hydraulic pressure is communicated to the disc brakes by the master cylinder 15, and thereafter the valve is caused to shutoff until a second level of pressure is reached at which time the hydraulic pressure is applied by the master cylinder to the disc brakes. To this end, the metering valve 20 comprises a valve body 21 having an inlet 22 for connection to the hydraulic pressure source or master cylinder 15, and at least one outlet 23, in the present instance a pair of outlets 23a and 23b for connection via hydraulic piping 17 to the disc brakes 11. As illustrated in FIG. 2, the inlet and outlet are connected by bore means 24, the bore means 24 being connected to the inlet 22 for fluid communication therewith as by an inlet extension 22a in a plug 25 secured in the inlet of the body 21. As shown, the bore 24 is radially and axially stepped to form annular shoulders 26 and 27, the purposes for which will be explained more fully hereinafter, the bore 24 extending axially through the body and communicating at the end 28 thereof through an aperture 28a with the atmosphere.

As shown in the drawings, interiorly of the bore 24 is slidable spool means 30 including primary spool biasing means, in the present instance a spring 31 which urges the tubular spool 30 towards the inlet 22 engaging the plug 25. As shown in FIG. 2, one end of the spring 31 is positioned against a collar 33 which abuts the shoulder 26 in the body 21, the opposite end of the spring engaging a radially and inwardly extending, annulus or stop 34 of the spool 30 thereby biasing the spool against the wall 25b of the plug 25. It is noted at this time that the spool 31 is recessed as at 36 and 37 to form shoulders and includes fluid bypass means, in the present instance axially extending, arcuately spaced grooves 30a, in the periphery of the spool, the purpose of which will be more fully described hereinafter.

Mounted interiorly of the bore 24 and, in the present instance substantially coaxial therewith, is plunger means 38, one end 39 of which is exposed to atmospheric pressure via the aperture 28a, the other end 40 of which extends into the tubular spool 30, the plunger being normally urged towards the inlet by secondary biasing means, in the present instance a spring 41 closely wound on the plunger, one end of which abuts the collar 33 and the other end of which engages a radical projection comprising a peripherally slotted, in the present instance trifurcated snap ring mounted in a recess 43 adjacent the end 40 of the plunger 38.

In order to permit free fluid communication between the inlet 22 and the outlet 23 when no pressure is applied to the inlet by the master cylinder 15, and in order to close off the path of fluid communication at a first level upon actuation of the master cylinder 15, while permitting fluid communication at a predetermined higher pressure level at the inlet, novel poppet means 50 are provided. To this end, the poppet means 50 comprises a cylindrical shuttle valve 51 including a radially extending disc-shaped closure element 52 thereon. The closure element 52 divides the valve into an inlet portion 51a and an outlet portion 51b, each being provided with axially extending, arcuately spaced flutes 53 and 54 forming axially extending intermediate passageways 55 and 56. As shown, the shuttle valve 51 also includes a cone-shaped depression 57 which cooperates with a like projection 44 on the end 40 of the plunger in order to maintain proper alignment of the poppet valve.

As best shown in the drawings, the shuttle valve 51 is housed interiorly of a tubular poppet retainer 60 which is mounted inside the spool 30 and retained therein by the shoulders 36 and 37 thereof and a ring 67. As noted in FIG. 2, an inwardly and radially projecting annular wall 61 of the poppet retainer 60 having a plurality of circumferentially spaced, axially projecting lugs 62 which engage the recess 25a associated with the end of the plug thereby effecting a seal. At the opposite end of the retainer 60 is an annular stop 63 which is engageable with the shoulder 37, the stop having circumferentially spaced radial recesses which permit fluid communication between the interior of the tubular poppet retainer and the outlet 23 of the valve. Referring now to FIGS. 5a and 5b the poppet retainer 60 is preferably composed of a resilient material such as a rubber which is impervious to hydraulic brake fluid, and which, by means of the inwardly projecting annular wall 61, operates to bias the shuttle valve 51 normally urging it away from the inlet passageway 22a.

At the opposite end of the retainer 60, adjacent the stop 63, is an inwardly projecting annular seal 64 which projects towards the axis of the shuttle valve a sufficient distance to permit engagement thereby when the shuttle valve moves away from the inlet. Movement of the shuttle valve is effected by movement of the plunger 38 away from the inlet (to the left in FIG. 2), thus permitting engagement of disc-shaped closure element 52 of the poppet valve 51 with the annular seal 64. As shown in FIG. 2 the initial position of the shuttle valve 51 with respect to the poppet retainer 60 is with the flutes 53 pushing against the annulus 61, this being caused by the engagement of the plunger 38 against the shuttle valve, the snap ring 42 engaging the stop 63 and thereby limiting the movement of the plunger towards the inlet. In this position the disc-shaped closure element 52 is axially spaced from the annular seal 64 and, fluid communication between the inlet 22 and the outlet 23 is permitted as fluid communication is through the passageways 55 intermediate the flutes 53, over the disc-shaped closure element 52, through the passageways 56 intermediate flutes, and the stop 63 and snap ring 42 and through the outlets 23.

In order to inhibit fluid communication with the atmosphere through the aperture 28a, an O-ring seal 70 is positioned circumscribing the plunger 38 for engagement therewith and engagement with the interior wall of the bore 24. As may be seen in FIG. 2, a seal back-up washer 71 is slidably mounted on the plunger and includes a conical seat 72 engageable with a like chamfered portion 73 on the plunger.

Operation of the metering valve is set forth below and more fully described in the Doerfler application, above identified. As has already been explained above, the quiescent position of the valve and its various parts is shown in FIG. 2 wherein a free flow fluid path is defined between the inlet and the outlet.

As fluid pressure is increased at the inlet by the hydraulic master cylinder 15, the cross sectional area of the plunger 38 is exposed to an increased pressure differential because the end 39 of the plunger is open to the atmosphere, while the end 40 is exposed to the increase in hydraulic inlet presure. This causes the plunger to start its leftward movement away from the inlet 22 and disengagement of the projection 44 on the end 40 of the plunger from the conical aperture 57 in the shuttle valve 51. The biasing action of the inwardly projecting annular wall 61 causes movement of the shuttle valve 51 away from the inlet until the disc-shaped closure element 52 contacts the annular seal 64. The inlet pressure at which the disc 52 contacts the seal 64 is a direct function of the compression in the plunger spring 41 and the axially exerting force caused by the annular wall 61, which opposes movement of the plunger towards the inlet. The "arresting" pressure (the point at which free fluid communication between the inlet and outlet is arrested) may therefore be set as desired, typical design pressures at which the disc 52 engages the seal 64 anywhere from 4 to 30 p.s.i.

As pressure is increased, some fluid flow will occur past the disc-shaped closure element 52 and by the seal 64 until the hydraulic pressure exerted on the inlet side of the disc 52 causes the disc to fully engage the seal 64. Isolation of the inlet from the outlet in this manner, i.e., by the soft resiliency of the seal 64, prevents a condition from occurring in the valve akin to "water hammer." Simultaneously, as the shuttle valve 51 more fully engages the seal 64, the end wall 61 starts straightening itself out and hydraulic fluid is permitted into the recess 25a of the plug 25 creating additional force on the end wall 61 and therefore additional pressure on the shuttle valve 51 against the seal 64. At this point the inlet may be considered isolated from the outlet.

At a second level of pressure at the inlet, preferably a level corresponding to the pressure at which the rear brakes will start to engage, communication between the inlet and outlet will be restored. Typically, it is desirable to have the valve crack open at a pressure of between 110 to 140 p.s.i. As pressure builds up on the walls 61 of the poppet retainer 60, intermediate the wall 61 and the recess 25a in the plug 25, the resistance to movement of the spool 30 by its biasing means or spring 31 will be overcome, and the spool will tend to move towards the outlet away from the inlet. As the spool 30 has peripheral and axially extending slots 30a, fluid communication between the inlet 22 and the outlets 23 occurs. Upon pressure communication with the outlet, the pressure at the outlet side of the spool approximates the pressure at the inlet causing the spool 30 to move back towards the inlet due to the pressure of the spring 31. However, the increase in pressure caused by the momentary cracking of the spool 30 increases the pressure differential on the plunger 38 causing the plunger to move rearwardly away from the inlet until the snap ring 42 engages the interior part of the end wall or stop 34 of the spool 30. At this point the differential pressure exerted on the plunger 38 by the outlet pressure relative to the atmospheric pressure at the end 39 of the plunger 38, moves the spool 30 away from the inlet and holds the spool away from the inlet until inlet pressure is reduced.

Upon reduction of inlet pressure the spool 30 will move back into engagement with the plug 25, the differential pressure across the shuttle valve, i.e., between inlet and outlet, causing the shuttle valve to move towards the inlet engaging the wall 61 and sealing the spool from the inlet extension passageway 22a. However, in this manner fluid communication is restored between the inlet and outlet and the pressure in the system drops to its residual state because the plunger 38, upon sensing the drop in pressure is caused to move by its spring 41 towards the inlet and into engagement with the shuttle valve 51 to keep the shuttle valve in its open position.

In conventional brake systems having all disc or all shoe type brakes, initial bleeding of the brake system to purge the system of any air entrained therein, is mandatory to proper operation of the brakes and to prevent a soft mushy feeling, by the driver, upon actuating the brake pedal. Conventionally, the brake system may be bled by opening a small pet cock or valve at the wheel piston or cylinder to the brake lines. When the brake pedal has been fully depressed, the pet cock is closed off and the pedal is permitted to move back to its initial or rest position and pressure is once again applied, and the pet cock is once again open. This procedure is continued until all of the air has been purged from each of the lines leading to the respective wheels.

In the present instance, as the metering valve 20 is interposed between the master cylinder 15 and the disc brakes 11, it is mandatory, when bleeding the disc brake lines, to override the operation of the metering valve so that it does not close off fluid communication between the master cylinder and the disc brakes upon depressing the brake pedal. In accordance with the invention, the bleed apparatus 100 includes a cap 101 and biasing pin 102 adapted to cooperate with the metering valve 20 to override the metering valve function of closure at a first level of pressure by maintaining the plunger 38 in its normal, non-pressurized condition, i.e., towards the inlet 22.

As shown in FIGS. 2 and 3, the body 21 of the valve 20 contains a tubular projecting extension 21a, in the present instance cylindrical in outer contour, while the cap 101 has a peripheral shape corresponding generally to the shape of the extension, and dimensioned to fit over the extension 21a. In the present instance the cap 101 includes a cylindrical upstanding wall 103 which merges into a bottom wall 104 from which the biasing pin 102 projects. As shown in FIG. 2, the cap is held in a first position by a cooperating bead and groove arrangement, in the illustrated instance the upstanding wall 103 of the cap containing an inwardly and radially projecting annular bead 105 which cooperates with a circumferentially extending groove 106 in the extension 21a. Axially spaced from the first groove 106 in the extension 21a is a second circumferentially extending groove 107, having arcuate dimensions similar to that of the groove 106 and adapted to receive, in a like manner to the groove 106 the bead 105.

The cap 101 is composed of, preferably, a resilient material but which is durable and tough enough to withstand considerable abuse. Such a material as nylon has been found suitable in the present application.

As shown in FIG. 2, the biasing pin 102 projects axially of the bore 24 of the body 21 into the aperture 28a at the end 28 of the extension 21a. The pin has an axial length sufficient to avoid interference between the plunger and the cap when the cap is in the first position, i.e., axially spaced from the terminal end 39 of the plunger 38. When it is desired to bleed the hydraulic piping 17 associated with the disc brakes 11, the cap 100 is moved to the second position, the bottom wall 104 of the cap 101 being pressed until the bead 105 deflects out of the first groove 106 and seats in the second groove 107. At this point, as shown in FIG. 3, the projecting terminal end 102a of the biasing pin 102 engages the terminal end 39 of the plunger 38 and impedes free movement of the plunger away from the inlet 22 of the valve 20 upon an increase in hydraulic pressure. In this manner the cap 101 may be left in the position shown in FIG. 3 until bleeding of the brake system is completed. Thereafter, closing off the pet cocks associated with each of the disc brakes and applying hydraulic pressure to the metering valve by the master cylinder until a pressure of between 250 p.s.i. and 400 p.s.i. is reached causes the plunger 38 to move against the pin 102 automatically disengaging the cap 101 from the groove 107 and moving it rearwardly so that the bead 105 engages in the groove 106. Although the cap may be disengaged automatically from its second position wherein the pin is in contact with the terminal end 39 of the plunger 38, it may also be disengaged and moved manually rearwardly for engagement with the first groove 106 in the extension 21a.

Thus the bleed apparatus of the present invention permits of unique override function which allows for bleeding of the brake lines in a hybrid brake system without any special tools or apparatus while acting as a dust cover for the terminal end of the plunger and the aperture 28a leading into the bore 24, thereby preventing contamination of the valve 20.

What is claimed is:

1. In a metering valve adapted to be positioned intermediate a source of hydraulic pressure and a pair of wheels having disc brakes thereon; said metering valve comprising a body having an inlet adapted for connection to said hydraulic pressure source and an outlet adapted for connection to said disc brakes; bore means connecting said inlet and said outlet; tubular spool means slidably mounted in said bore having a fluid passageway therethrough and primary biasing means urging said spool means toward said inlet; slidably mounted plunger means in said bore, a tubular extension on said body, said plunger positioned in said extension, an aperture at one end of said extension communicating with the atmosphere and one end of said plunger, and secondary biasing means connected to said plunger to urge said plunger towards said inlet; poppet means cooperating with said plunger and urged thereby towards said inlet whereby fluid communication is effected between said inlet and said outlet through said tubular spool until a predetermined pressure is reached at said inlet, poppet biasing means normally urging said poppet away from said inlet and towards said plunger; said plunger movable away from said poppet as fluid pressure is increased at said inlet until a predetermined pressure is reached and said poppet closes fluid communication between said inlet and said outlet; improved brake bleed apparatus for said valve, said apparatus comprising: a cap having an upstanding cylindrical side wall and a bottom wall; said cylindrical side wall being dimensioned to fit over said extension; a radially projecting, circumferentially extending bead on one of said side wall and said extension; and at least a pair of axially spaced circumferentially extending grooves in the other of said side wall and extension for cooperation and coacting engagement with said bead; a pin in said aperture; said pin having an axial length such as to avoid interference between the end of said plunger exposed to atmospheric pressure and said cap when said bead is engaged in the first of said grooves, and to engage the plunger to restrain movement thereof when said bead engages the second of said grooves.

2. A brake bleed device for a metering valve including a body having a bore intermediate an inlet and outlet and a plunger therein for effecting closure of the valve upon an increase in hydraulic pressure at the inlet, one end of said plunger being in communication with the atmosphere, closure of said valve being caused by an increase in hydraulic pressure gradient across said plunger relative to the atmosphere; said bleed apparatus comprising a cap having an upstanding cylindrical side wall and bottom wall, and an extension on said valve having a bore therein in which said plunger is positioned, and an aperture in said extension communicating said extension to said atmosphere; said cylindrical side wall being dimensioned to fit over said extension; a radially projecting, circumferentially extending bead on one of said side wall and said extension; and at least a pair of axially spaced circumferentially extending grooves in the other of said side wall and extension for cooperation and coacting engagement with said bead; a pin in said aperture; said pin having an axial length such as to avoid interference between the end of said plunger exposed to atmospheric pressure and said cap when said bead is engaged in the first of said grooves, and to engage the plunger to restrain movement thereof when said bead engages the second of said grooves.

3. A brake bleed device in accordance with claim 2 wherein said pin is mounted on the bottom wall of said cap.

4. A brake bleed device in accordance with claim 3 wherein said bead is mounted interiorly of said cap and projects inwardly from said upstanding cylindrical side wall, said grooves being positioned in said extension.

References Cited

UNITED STATES PATENTS

| | | | |
|---|---|---|---|
| 3,278,241 | 10/1966 | Stelzer | 303—6 |
| 3,304,130 | 2/1967 | Doerfler | 303—6 |

MILTON BUCHLER, *Primary Examiner.*

JOHN J. McLAUGHLIN, *Assistant Examiner.*

U.S. Cl. X.R.

60—54.5; 137—495; 188—152